United States Patent [19]
Luehrs et al.

[11] Patent Number: 6,053,926
[45] Date of Patent: Apr. 25, 2000

[54] APPARATUS FOR APPLYING EAR TAGS TO ANIMALS' EARS

[75] Inventors: Friedrich Luehrs, Rehden; Goerg Luehrs, Kassel, both of Germany

[73] Assignee: Georg Luehrs, Kassel, Germany

[21] Appl. No.: 09/250,313

[22] Filed: Feb. 15, 1999

[30] Foreign Application Priority Data

Feb. 17, 1998 [DE] Germany .......................... 198 06 381
Aug. 3, 1998 [DE] Germany .......................... 198 35 014

[51] Int. Cl.$^7$ .................................................. A61B 17/00
[52] U.S. Cl. ............................................................ 606/117
[58] Field of Search .................................... 606/117, 188

[56] References Cited

U.S. PATENT DOCUMENTS

| | | | |
|---|---|---|---|
| 4,506,671 | 3/1985 | Green | 606/117 X |
| 4,696,119 | 9/1987 | Howe et al. | 606/117 X |
| 4,932,953 | 6/1990 | Cohr | 606/117 |
| 5,234,440 | 8/1993 | Cohr | 606/117 |
| 5,441,514 | 8/1995 | Durham | 606/188 |

FOREIGN PATENT DOCUMENTS

| | | |
|---|---|---|
| 0 002 619A2 | 6/1979 | European Pat. Off. . |
| 28 40 268 | 3/1980 | Germany . |
| 197 07 752 A1 | 9/1997 | Germany . |
| 197 26 467 A1 | 12/1998 | Germany . |
| 840 25 97 | 3/1986 | Netherlands . |
| 1 010 727 | 7/1979 | United Kingdom . |
| 2 010 727 | 7/1979 | United Kingdom . |
| 2119319 | 11/1983 | United Kingdom .................. 606/117 |
| WO 94/14316 | 7/1994 | WIPO . |

*Primary Examiner*—Jeffrey A. Smith
*Attorney, Agent, or Firm*—Michael J. Striker

[57] ABSTRACT

An apparatus for fitting ear tags in animal ears (40) is described. Such devices serve to distinguish animals, especially pigs. According to the invention two magazines (9, 10) are provided for ear tag parts (18, 19), which slide down in the magazines (9, 10) through gravity. The one ear tag part (18) is removed from the magazine (9) by a punch (12), which is actuated by a pedal, pushed through the animal's ear and connected to the other ear tag part (19). The ear tag parts (18, 19) are held before this fitting operation in positioning means (31, 32) arranged below the magazines (9, 10) and arranged thereby in fitting positions.

13 Claims, 8 Drawing Sheets

APPARATUS FOR APPLYING EAR TAGS TO ANIMALS' EARS

BACKGROUND OF THE INVENTION

This invention relates to al apparatus for fitting ear tags in animal ears, wherein the ear tags comprise a first part provided with a pin and a second part provided with an eye, and said apparatus comprising: a fitting zone, positioning means spaced on the two sides of the fitting zone for arranging the first and second parts in fitting positions, two magazines in the form of guide tracks for receiving a plurality of first and second parts respectively, by means of which the first and second parts can be fed one after the other under the action of a force to the positioning means, a stop associated with the second positioning means for the second parts and a reciprocating punch, by means of which one of the parts located in the fitting position can be so punched out of this position and moved transversely through the fitting zone in the direction of the other part, that the pin and the eye come into engagement with each other and connect the two parts together.

Ear tags which consist of first and second parts are used to distinguish animals, especially pigs, the parts also being called male and female ear tag parts. The male ear tag parts comprise pins provided with undercuts for pushing through the animal ears, whereas the female ear tag parts have eyes which receive the pins and engage behind the undercuts and are thereby fixedly attached to the male ear tag parts.

Fitting the ear tags in the ears of animals is effected as a rule by pliers. An example of such pliers is shown in the document DE 2 840 268 A1, in which the male ear tag part is guided by a prong. The operation of fitting the tag in the ear consists essentially of the following working steps: Introducing the ear tag into the pliers, grasping the animal to whom an ear tag is to be applied, squeezing the pliers together in order to press the ear tag into the ear of the animal and opening the pliers, in order to let the ear tag out of the pliers. One hand is needed throughout the whole operation to handle the pliers, so that only one hand is ever available to hold the animal fast. Furthermore the pliers have to be loaded with a new tag after each application of an ear tag, which acts against a flowing working cycle. The apparatus according to DE 19 707 752 A1 does represent some improvement, wherein one plier part is held on a stand, which allows the pliers to be operated by a foot pedal. However the construction of this apparatus does not allow a smooth working cycle, since a new ear tag has to be loaded into the pliers after each fitting operation.

An apparatus of the kind initially specified has accordingly already been proposed (WO 94/14316), which comprises a magazine for receiving a plurality of male and female ear tag parts in the form of an interchangeable cartridge. The male and female ear tag parts are each guided in a guide track and are biased by means of a spring in the direction of positioning means in the form of stops, which are arranged in the region of a fitting zone. The structure of the apparatus is comparatively complex and thus expensive and prone to faults. Moreover the ear tags cannot be refilled during continuous use of the apparatus, so that it is necessary to exchange the cartridge after using up the existing ear tags. The like applies to another known apparatus of this kind (GB 2 010 727 A1).

Corresponding apparatuses are known for ear tags (EP 0 002 619 A2) in which the two parts are connected together by a connecting web. Here also the transport of the ear tags present in a magazine to the fitting zone is effected with the aid of a biasing spring.

SUMMARY OF THE INVENTION

In contrast to this the invention is based on the object of so designing the apparatus of the kind initially defined that it has a more simple and cost-effective structure.

A further object is to design the apparatus such that it is operational reliable.

Yet another object of this invention is a construction of the apparatus which reduces the time needed to put the ear tags into the magazine.

And according to yet another object of this invention the apparatus is to be designed so that it simplifies the action of fitting the ear tags in the animal's ears.

These and other objects of this invention are solved by arranging and designing the magazines so that the first and second parts can be fed to the positioning means under the action of gravity.

The invention provides the advantage that the male and female ear tag parts are transported into their fitting position under the action of gravity. A simpler structure is provided by this, which requires neither additional means in the form of springs for transporting the parts into the fitting position nor interchangeable magazines. On account of their transport by gravity alone, the ear tag parts can be loaded continuously during use of the apparatus, so that there are no down times arising from exchanging magazines or special loading of the ear tag parts.

Further advantageous features of the invention appear from the dependent claims.

The invention will now be described in more detail in conjunction with the accompanying drawings of embodiments, in which:

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENT

Figure 1:
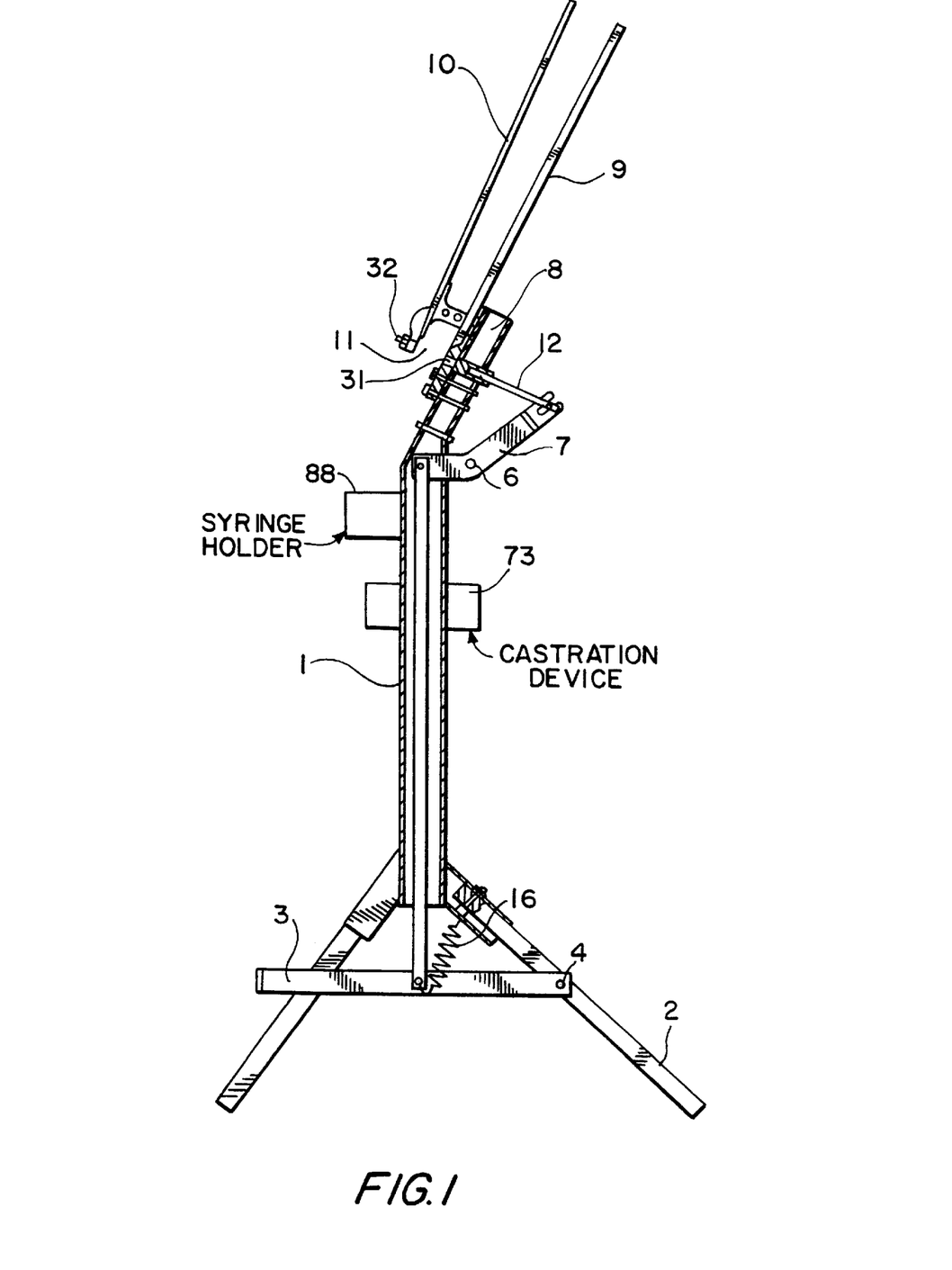
FIG. 1 is a schematic vertical section through a first embodiment of the apparatus according to the invention.
Figure 2:
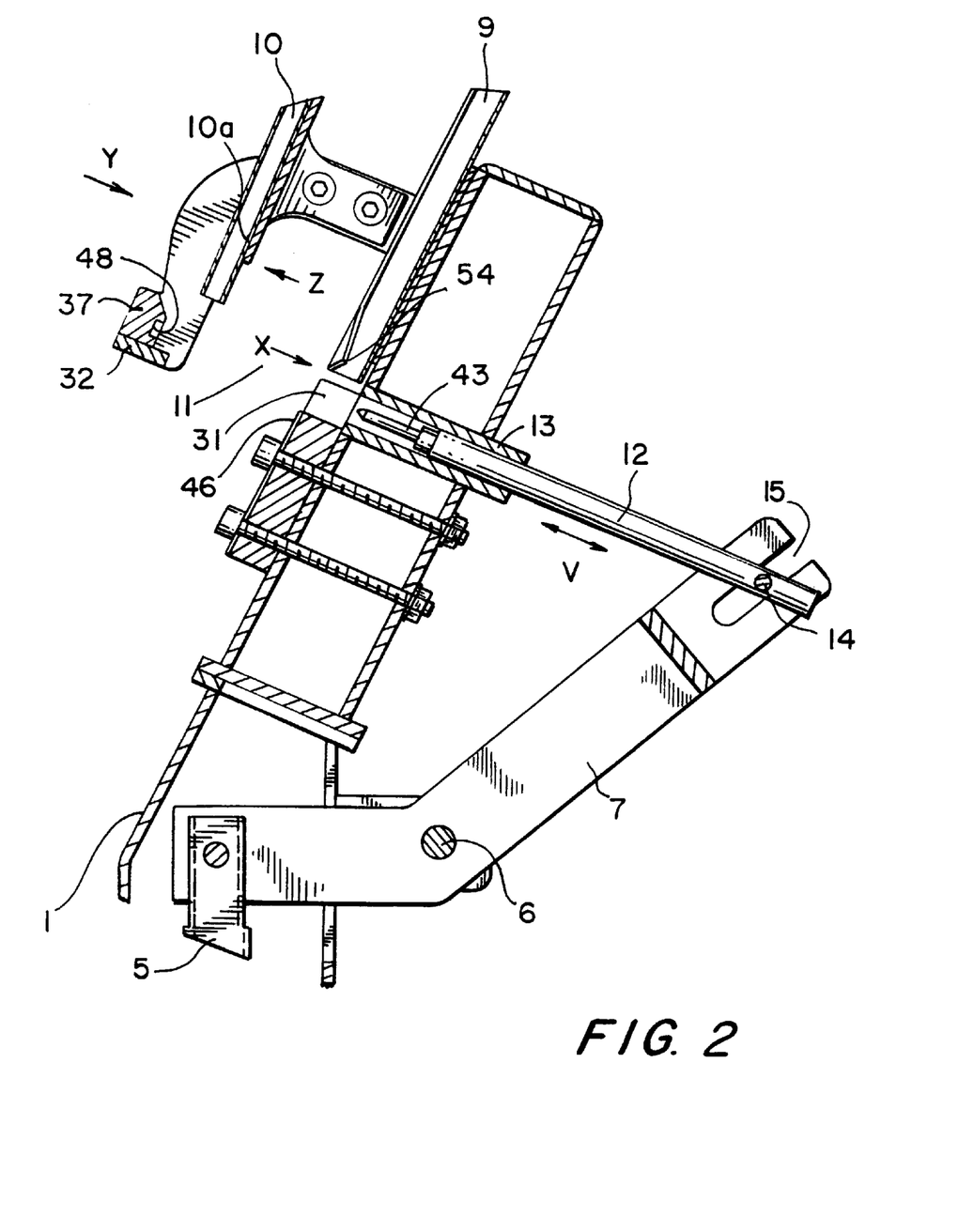
FIG. 2 is detailed cutaway view of the section of the apparatus of FIG. 1 including a fitting zone.
Figure 3:
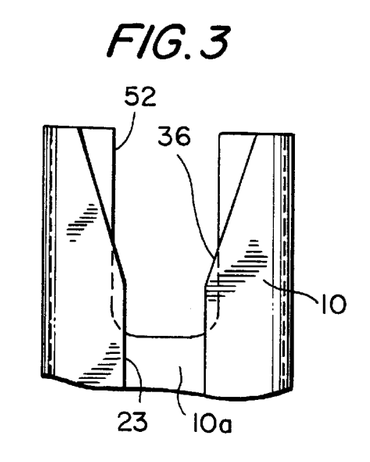
FIG. 3 is a front view of an upper part of a magazine for female ear tag parts of the apparatus according to FIG. 1.
Figure 4:
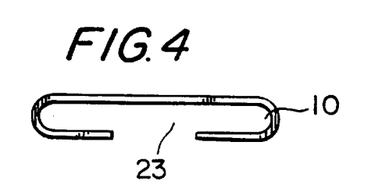
FIG. 4 is a plan view of the magazine according to FIG. 3.
Figure 5:
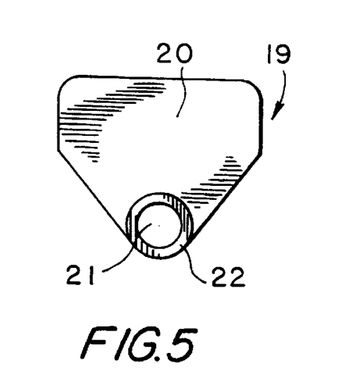
FIG. 5 is a front view of a female ear tag part.
Figure 6:
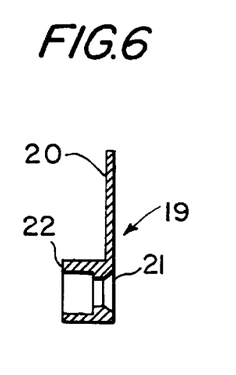
FIG. 6 is a longitudinal section through the female ear tag part according to FIG. 5.
Figure 7:
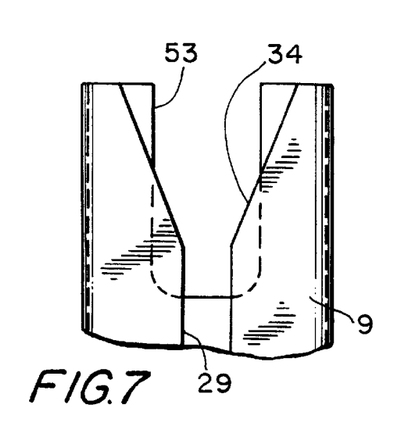
FIGS. 7 and 8 are views corresponding to FIGS. 3 and 4 of a magazine for male ear tag parts of the apparatus according to FIG. 1.
Figure 8:
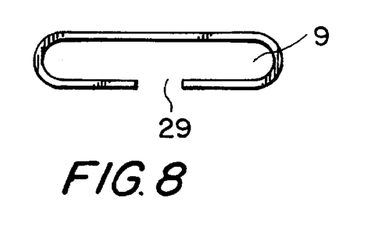

The embodiment of the apparatus according to the invention for fitting ear tags in animals' ears currently considered the best is shown in FIGS. 1 to 16. As firstly FIGS. 1 and 2 show, it comprises a frame 1 with a base part 2, in which a pedal 3 is pivotally mounted at 4. The lower end of a pull/push lever 5 is articulated to a middle part of the pedal 3, with its upper end pivotally attached to a lever 7 mounted in the frame 1 at 6. The frame 1 is provided at the upper end with a holder 8, on which two magazines 9 and 10 are rigidly fixed, with their lower ends spaced from one another on the two sides of a fitting zone 11. The magazines 9, 10 assume a position inclined to the vertical when the apparatus stands on horizontal ground, in accordance with FIG. 1. As FIG. 2 in particular shows, a punch 12, preferably straight, is provided in the region of the fitting zone 11 and can reciprocate transversely to this zone in the direction of a double arrow v, being mounted in a guide 13, preferably formed as a straight guide. The rear end of the punch 12 lies in a forked end section of the lever 7 and is articulated to the lever 7 for being driven thereby by means of a transverse pin 14, which passes through the slot 15 open to the edge of this end section. The arrangement is such that the punch 12 is moved by means of the pedal 3 against the force of a spring 16 (FIG. 1) in the direction of the fitting zone 11 and is retracted, when the pedal 3 is released, by the spring 16 into the position seen in FIGS. 1 and 2.

According to FIGS. 3 to 9 the magazines 9 and 10 are formed as guideways with C-shaped cross-sections in order to receive the two parts 18, 19 of ordinary ear tags. The basis for this is that the first part 18 in ordinary ear tags is a so-called male ear tag part and the second part 19 is a so-called female ear tag part. The second part 19 consists according to FIGS. 5 and 6 of a flat plate 20 with an eye 21, which is surrounded by a cylindrical protective collar 22. The C shape of the magazine 10 is correspondingly so formed according to FIGS. 3 and 4 that it defines a guide slot 23 which can receive the protective collar 22 when the plate 20 is fed into the sections beside the guide slot 23, substantially parallel to the rear side of the C profile. In contrast, the first part 18 of the ear tag consists according to FIGS. 9 and 10 of a flat plate 24 with a pin 25 projecting therefrom and provided at the free end with a point 26 and in the rear region with a blind bore 27, cylindrical for example. The point 26 moreover forms an undercut 28 which, after being driven into the eye 21 of the second part 19, engages behind this and accordingly connects the two parts 18, 19 firmly together axially in interlocking manner. The C profile of the magazine 9 is so formed that it has a guide slot 29 which can receive the pin 25, when the plate 24 is guided in the magazine 9 in the sections beside this, substantially parallel to the rear side of the C profile.

According to FIG. 2 positioning means 31 and 32 are arranged on the two sides of the fitting zone 11, below the magazines 9 and 10 respectively, serving to dispose the first and second parts 18, 19 in respective proper positions for the ear tag insertion.

Figure 11:
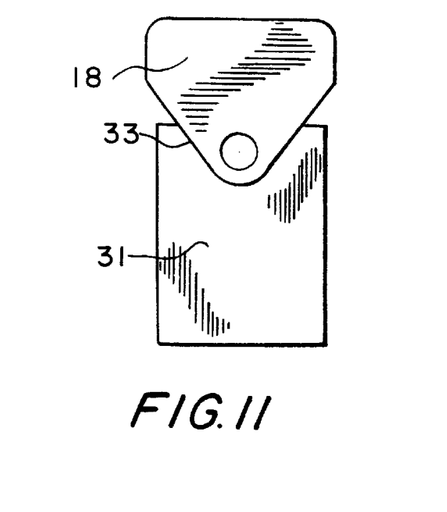
FIG. 11 shows a positioning means for the male ear tag part in a front view corresponding to FIG. 9.
Figure 12:
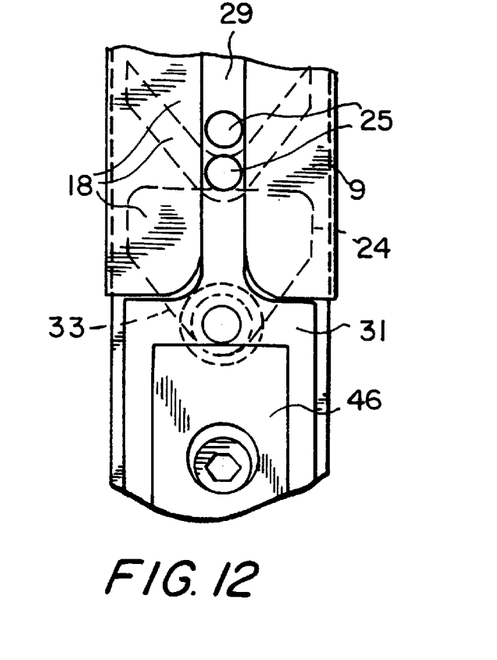
FIGS. 12, 13 and 14 are partial views of the magazines and positioning means in the direction of arrows X, Y and Z respectively in FIG. 2, wherein the magazines in FIGS. 12 and 13 are filled with male and female ear tag parts respectively, in contrast to FIG. 2.

The positioning means 31 is in essence a plate disposed closely beneath the magazine 9, with its upper edge formed as a catch device, which has a contour 33 visible in FIGS. 11 and 12, which is advantageously formed to complement the lower section of the part 18 for exact positioning of the first part 18. The positioning means 31 is moreover advantageously disposed such a distance below the lower, downwardly open end of the magazine 9 that a first part 18 of the ear tag located therein is still partially within the magazine 9 when its lower section lies on the contour 33 of the positioning means 31, so that the tag cannot fall forward out of the magazine. Accordingly a part 18, when it is fed into the magazine 9 from above along a feed funnel (FIG. 7), slides down in the magazine under the influence of gravity, with its plate 24 on the positioning means 31 and then automatically assumes the desired position for the fitting operation.

Figure 13:
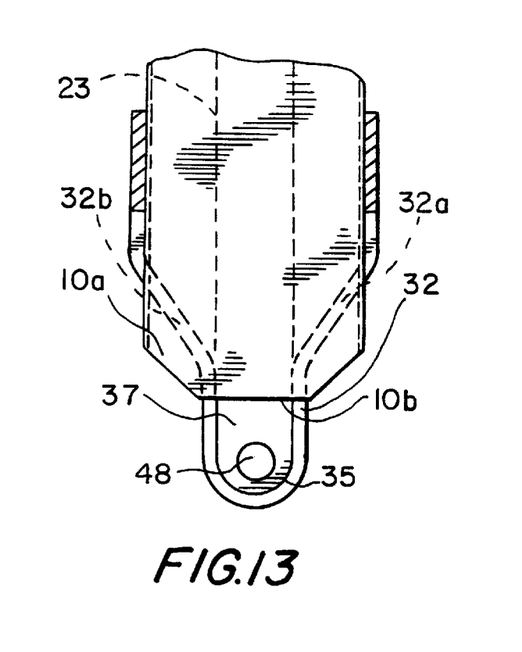

The positioning meals 32 has a similar function. As in particular FIG. 13 shows from the side of the fitting zone 11 and FIG. 14 from the opposite side, the positioning means 32 is formed as a catch device arranged below the magazine 10, having a contour 35 in the lower region which is formed with a complementary shape to selected sections of the parts 19, here the lower halves of the protective collars 22, for exact positioning of the second parts 19. Wall parts 32a, 32b diverging upwards in wedge manner adjoin the contour 35 and provide guiding for the protective collar 22 when the parts 19 fall on to the positioning means 32. The positioning means 32 is advantageously disposed such a distance below the downwardly open end of the magazine 10 that a second part 19 of the ear tag located therein is still partially in the magazine when it lies on the contour 35 and therefore cannot fall out of the positioning means 32. Accordingly when a part 19 is fed into the magazine 10 from above through a feed funnel 36 (FIG. 3), it slides down the magazine under the action of gravity and falls with its protective collar 22 on the positioning means 32 and then automatically assumes the desired position for the fitting operation. As FIG. 2 shows, a rear side 10a of the magazine 10 faces the front side of the magazine 9 with the guide slot 29. The guide slot 23 of the magazine 10 thus lies on the side facing away from the fitting zone 11 and the positioning means 32 moreover lie so far in front of the guide slot 23 that the part 19 lying with its protective collar 22 on it can be withdrawn below through a gap formed between the rear side 10a of the magazine 10 and the positioning means 32.

Figure 14:
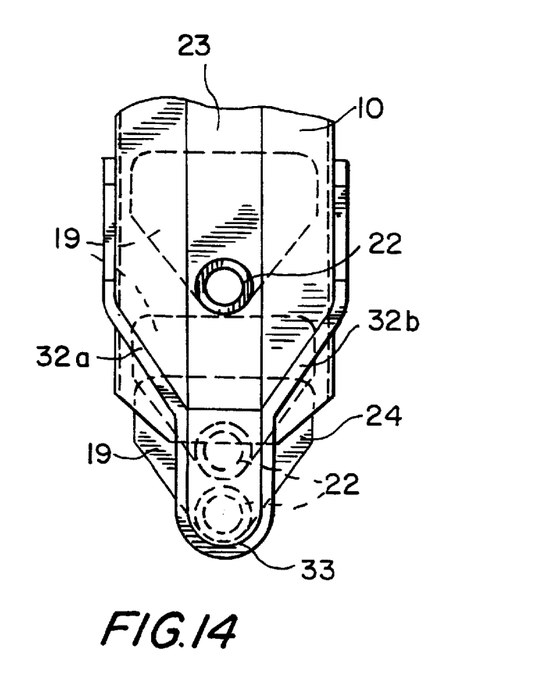

The positioning means 32 for the second parts 19 is provided with a stop 37 (FIG. 2) on its rear side, with which the front end of the protective collar 22 of the second part 19 comes into abutment, when this part lies on the positioning means 32. Accordingly removal or falling out of the parts 19 in the direction of the arrow Z in FIG. 2 is prevented. The manner of operation of the apparatus described is, as FIGS. 15 and 16 in particular show, essentially as follows:

The magazines 9 and 10 are first filled from the upper filling funnels 34, 36 with the ear tag parts 19 and 18 respectively. The widths of the guide slots 23, 29 are so selected that the protective collars 22 and pins 25 respectively slide through reliably but are also guided. The precise position of the parts 18 and 19 relative to one another plays no role in this. Rather, because of the chosen design and arrangement of the magazines 9, 10 and the positioning means 31, 32, the parts 18, 19 can slide down in the magazines 9, 10 and be so stacked one on the other that either the lower edges of the protective collars 22 or the pins 25 of any part 18, 19 lie on the upper edges of the plates 20, 24 of the parts 18, 19 lying thereunder or conversely the lower edges of the plates 20, 24 of any part 18, 19 lie on the upper edges of the protective collars 22 or pins 25 of the parts 18, 19 lying thereunder, as is indicated in FIGS. 12 and 14. Moreover the depth of the guide tracks formed by the C profiles is so selected that the parts 18, 19 placed in the magazines 9, 10 can only slide down under gravity one over the other, not behind or beside one another and only the lowermost part 18, 19 of the stack lies on the corresponding positioning means 31, 32 and thus comes into the range of the punch 12 and can be engaged thereby.

Figure 15:
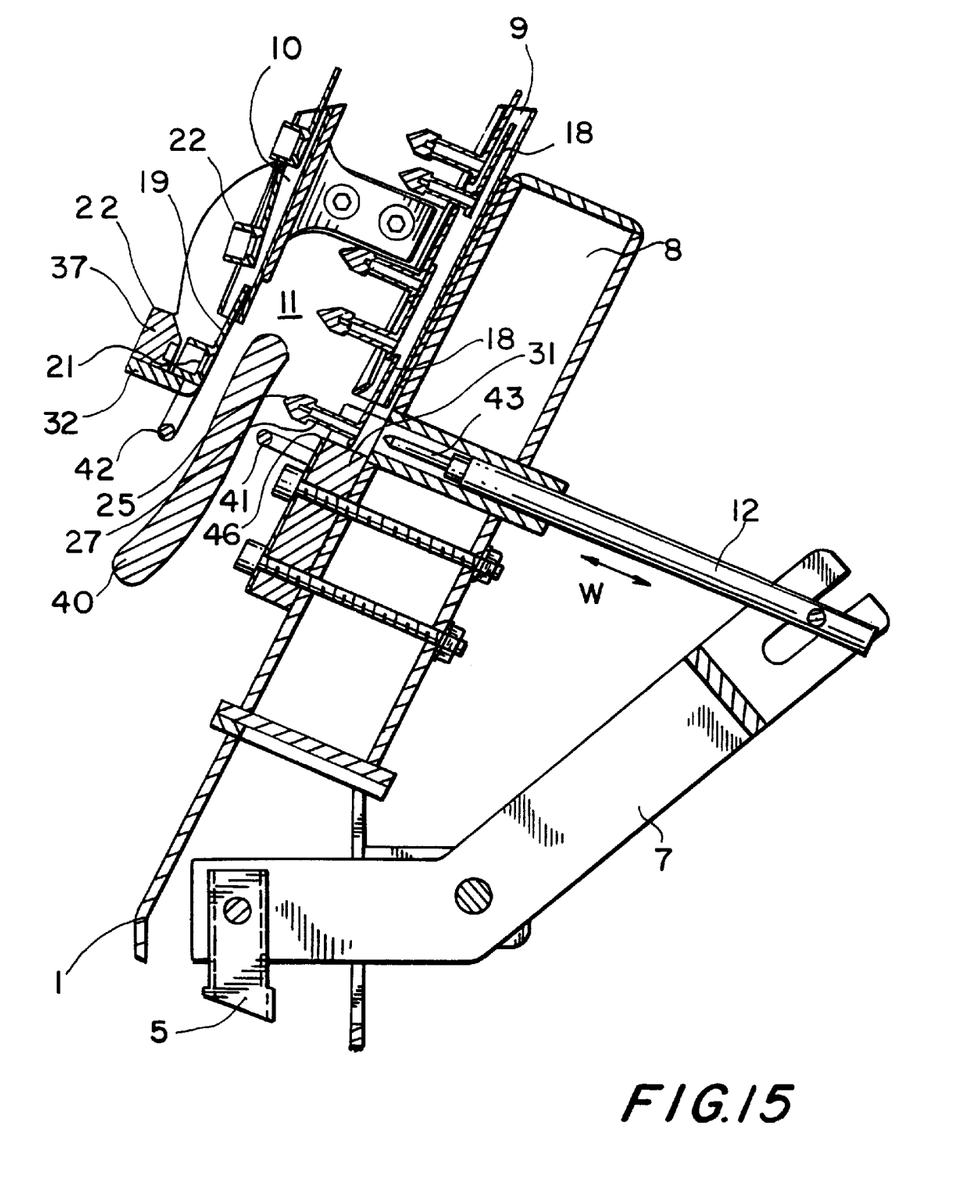
FIGS. 15 and 16 show sections schematically corresponding to FIG. 2 of the apparatus according to FIG. 1 in different operating states during use.

After filling the magazines 9, 10 an animal ear 40 schematically indicted in FIGS. 14 and 15 can be arranged in the fitting zone 11. The pedal 3 is then actuated, whereby the punch 12 is advanced and thus pressed from behind against the first part 18 lying on the positioning means 31. The part 18 is thus pushed out of the positioning means 31, i.e. from the arresting tray and pushed forward in the direction of an arrow w (FIG. 15), through the fitting zone 11, against the second part 19 held in the associated positioning means 32 (FIG. 16), whereby the pin 25 firstly penetrates the animal ear 40 and then enters the eye 21 of the part 19. Since this is prevented by the stop 37 from shifting in the Direction of the arrow w, the pin 25 penetrates the eye 21 completely, until the undercut 28 (FIG. 10) produces the desired interlocking connection. The pedal 3 is then released, whereby the punch 12 is retracted by the spring 16 into the position according to FIG. 15. The animal ear 40 can now be removed from the fitting zone 11, whereby the second part 19 still located on the positioning means 32 is withdrawn therefrom to the rear, i.e. opposite to the arrow w. As soon as this state is reached and the punch 12 has been withdrawn behind the positioning means 31, the next parts 18, 19 of the magazine stacks slide down under the effect of gravity till they lie on the positioning means 31, 32, so that the next animal ear 40 can be fitted with an ear tag in the described manner. At the same time new ear tag parts 18, 19 can be loaded into the magazines 9, 10 during the continuing operation, so that these always remain at least partially full.

In order to avoid the lowermost parts 18, 19 being inadvertently pushed out of the positioning means 31, 32 when introducing the animal ear 40 to the fitting zone 11, or being canted therein, safety elements 41 and/or 42 (FIGS. 15, 16) are preferably associated with the positioning means 31, 32, e.g. formed as U-shaped protective loops. These protective elements 41, 42 are so arranged that they shield the parts 18, 19 from below as the animal ear 40 approaches.

Figures 9, 10:
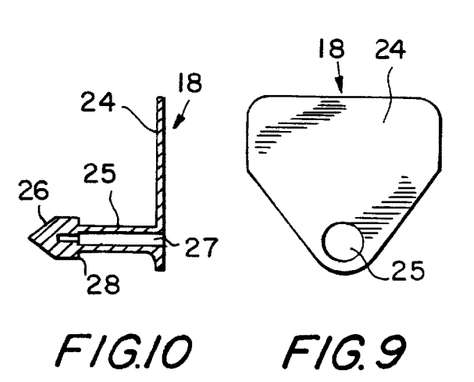
FIGS. 9 and 10 are views corresponding to FIGS. 5 and 6 of a male ear tag part.

As FIG. 10 in particular shows, the pins 25 of the first parts 18 each have a blind bore 27 open to the rear side. Accordingly a prong 43 is advantageously provided on the front face of the punch 12, projecting perpendicularly therefrom, its shape and size being so selected that is fits in the blind bore 27. The arrangement is moreover so designed that the blind bore 27 is aligned substantially coaxial with the prong 43 when the first part 18 lies on the positioning means 31. Accordingly, if the punch 12 is advanced, the prong 43 penetrates the blind bore 27 (FIG. 16), whereby straight advance of the part 18 and reliable introduction of the pin 25 into the eye 21 of the second part 19 are ensured. This is so even if a first part 18 located on the positioning means 31 should be somewhat canted relative to the punch 12.

Figures 17, 18, 19:
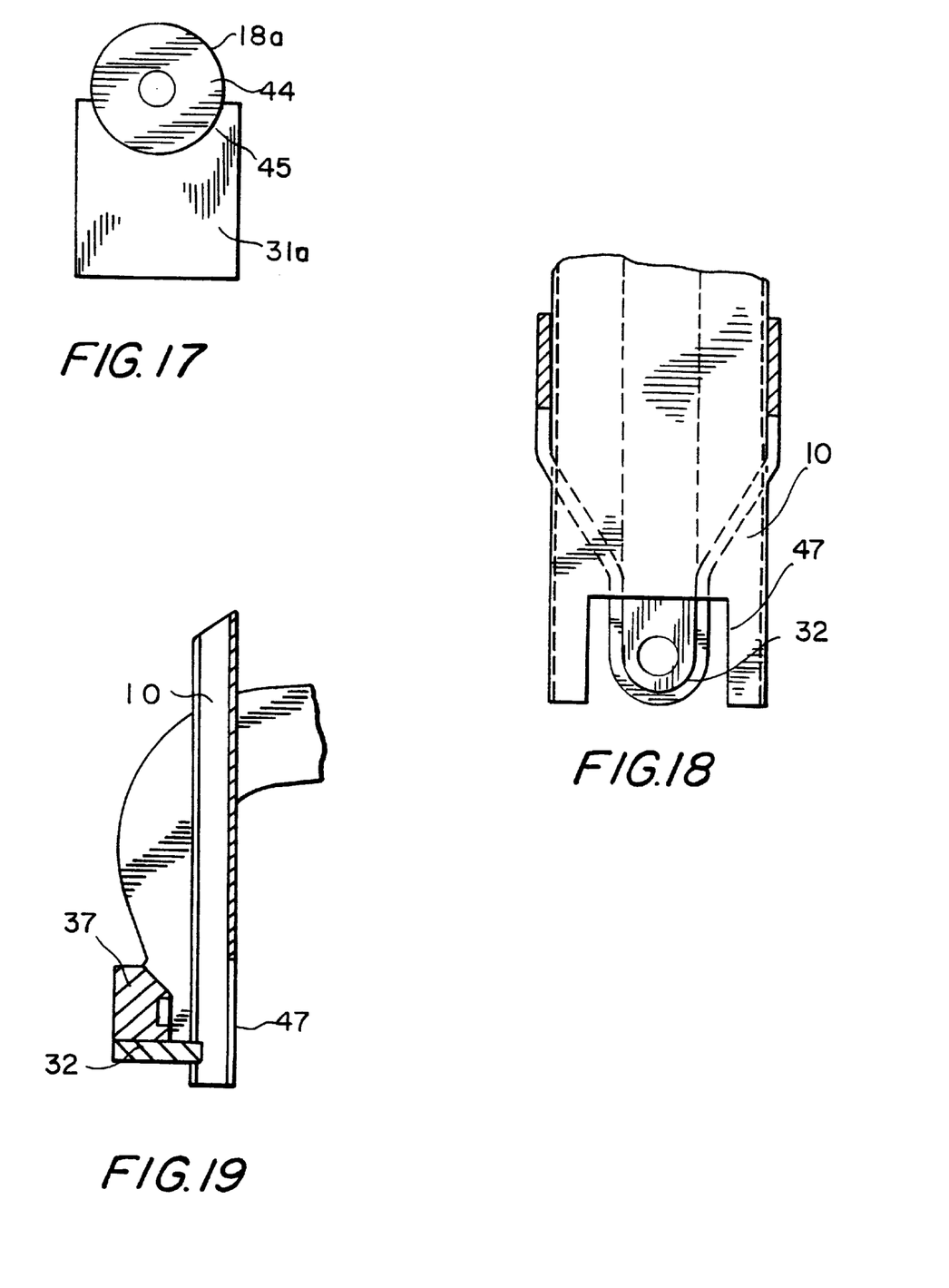
FIG. 17 shows a view corresponding to FIG. 11 of an alternative positioning means when using other male ear tag parts.
FIG. 18 is a view corresponding to FIG. 13 of an alternative embodiment for positioning female ear tag parts.
FIG. 19 is a longitudinal section through the positioning means according to FIG. 18.

If other known ear tags, e.g. those with circular plates 44 (FIG. 17) are used instead of the described ear tags substantially triangular in the lower region (FIGS. 5, 6, 9, 10), the described manner of operation is essentially identical. The corresponding positioning means can be given suitably matched, circular contours 45 for exact positioning, as is indicated in FIG. 17 for a first part 18a and a positioning means 31a. Moreover it can be provided that the magazines 9, 10 or the guideways formed thereby and if required the prong 43 are suitably adapted. It is particularly advantageous if these parts suiting some or all current ear tags are held in store and are fitted in the apparatus so as to be easily interchanged, e.g. with the aid of easily accessible attachment screws, so that they can be exchanged easily in dependence on the ear tag shape or size present in a particular case.

The first and second parts 18, 19 normally consist of plastics material, at least the plates 20, 24 (FIGS. 5, 9) being flexible. Accordingly they can deform sufficiently in the described fitting operation, which facilitates their ejection or pulling out of the associated magazines 9, 10 or positioning means 31, 32 during the fitting operation or thereafter.

Figure 16:
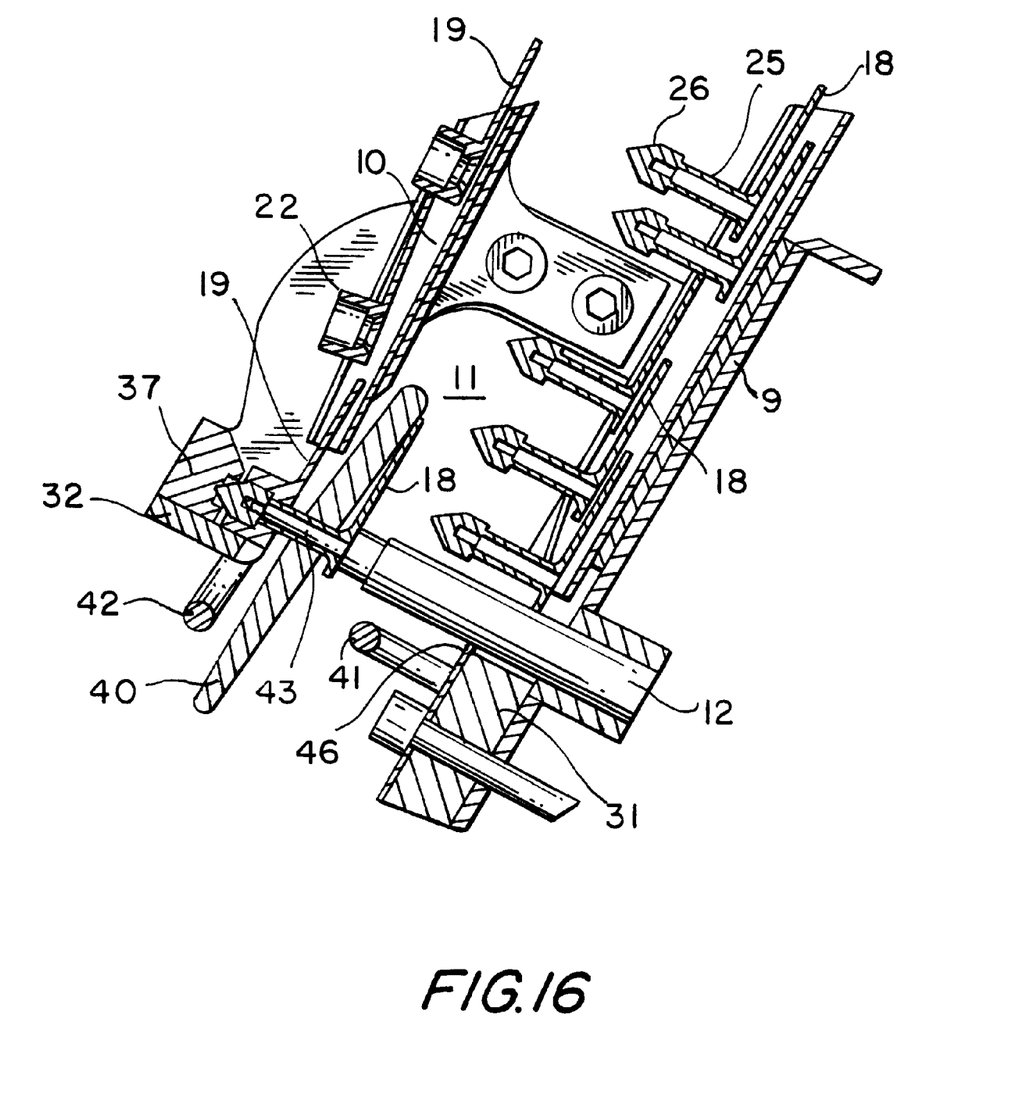

In order to improve the positioning of the first parts 18 an additional retainer 46 is preferably provided according to FIGS. 2, 15 and 16. This is in the form of a flat plate for example and is so fitted on the front side of the positioning means 31 that it at least partially covers the arresting tray formed thereby at the front (FIG. 12) and thereby prevents the first parts 18 inadvertently falling out. The retainer 46 and be made flexible if necessary or at least be fixed resiliently in the direction of the fitting zone 11 (arrow w in FIG. 15) on the positioning means 31, especially if the first parts 18 consist of comparatively rigid, inflexible materials. Such first parts can thus easily be advanced into the fitting zone 11 by the punch 12 even in the presence of the retainer 46.

The positioning means 31, 32 or the arresting trays formed thereby are moreover so designed and/or arranged that a region open towards the fitting zone 11 results, even when the parts 18, 19 lie thereon and are arranged partially therein and partially in the magazines 9, 10, facilitating the punching out or pulling out of the parts 18, 19, as FIGS. 12, 14 and 15 in particular show. In relation to the second parts 19 such a region can above all be created ill accordance with FIGS. 18 and 19 in that the C profile of the magazine 10 is provided with a cut-out 47 at the lower end and at the rear side 10a. This makes it possible, especially when using round ear tags (FIG. 17) for the second parts 19 to be removed easily from the fitting position after fitting on the animal ear 40. Alternatively the rear side 10a of the magazine 10 can be cut off in accordance with a line 10b (FIG. 13) at a sufficient height above the contour 35.

According to a further preferred embodiment, the cross section of the prong 43 (FIGS. 15, 16) of the punch 12 is at least partially somewhat greater than the internal cross-section of the blind bore 27 (FIG. 10). Accordingly the prong 43 is clamped in the first part 18 during the fitting operation. The result of this is that the punch 12 carries the first part 18 with it when it is retracted by the spring 16 (FIG. 1), whereby the second part 19 is automatically pulled out of the positioning means 32 and brought into the fitting zone 11, so that a largely painless removal of the animal ear 40 from the fitting zone 11 is possible. When the first part 18 strikes the front side of the magazine 9 and the retainer 46, the prong 43 is automatically withdrawn from the first part 18 again.

In order to avoid subsequent injury to the animal provided with the ear tag, through the point 26 (FIG. 10) inadvertently penetrating the animal's hide, the stop 37, preferably consisting of steel is preferably provided with a blind bore 48 facing the fitting zone 11, as FIGS. 2 and 13 show. This is so formed that the point 26 penetrates into the blind bore 48 when the part 18 is pushed forward by the punch 12 and is pressed flat on its bottom or flatted off.

In the embodiment according to FIGS. 1 to 19, the male ear tag parts 18 lie on the right side of the schematically shown animal ear 40 in FIGS. 15 and 16 and the female ear tag parts 19 on the contrary on the left side in FIGS. 15 and 16. If it is desired to alter this relative position, without having to introduce the animal ear 40 into the fitting zone other than as shown, the positions of the magazines 9 and 10 and the associated parts can be correspondingly interchanged compared with FIGS. 1 to 19.

Figure 20:
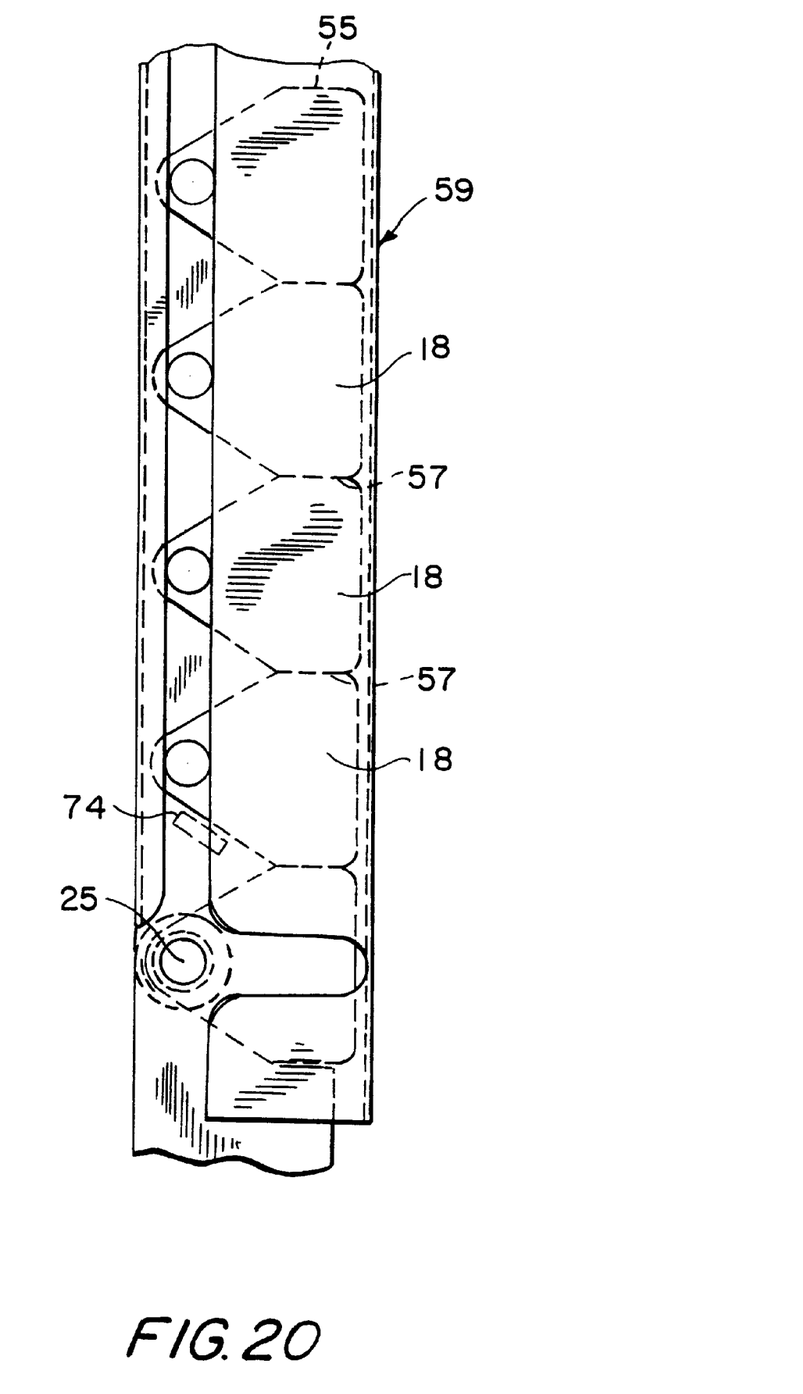
FIG. 20 is a front view of a second embodiment of a magazine for male ear tag parts.

In the previously described embodiments the male and female ear tag parts 18, 19 are fed into the magazines 9, 10 individually and separate from one another. As well as these there are also known attached male ear tag parts 18 (FIG. 20) and corresponding attached female ear tag parts, which in each case form a strip 55 of e.g. five parts 18 lying one after the other, which are attached at their side edges by thin plastics webs formed as break or tear lines 57. When using such attached parts 18 at least one of the magazines, e.g. 59, is preferably so pivotally mounted or so provided with a pivoted retaining pin 74 that on the one hand undesired following slipping of the first or second part 18 is avoided during the punching out operation and at the same time reliable separation along the break lines 57 is achieved.

The invention is not limited to the described embodiments which can be modified in numerous ways. This applies in particular to the shape and the materials of the ear tags employed and the cross-sections profiles of the magazines and positioning means provided to match these, and which could also be made wedge-shaped for example. In particular it is possible to attach the male ear tag parts and the female ear tag parts by a plastics or paper strip (e.g. adhesive tapes). With such an attachment the ear tag parts can be introduced into the respective magazine 9, 9c or 10, 10c in a pack. In this connection it is advantageous to provide the C profiles with a further longitudinal slot 52 and 53 respectively, e.g. on the rear side, which simplifies peeling off the plastics or paper strip in the respective magazine. Furthermore at least the upper regions of the magazines or the C-shaped profiles can receive the first and second parts with sufficient play for free-running, automatic transport under the effect of gravity to be ensured. For the same reason the stacks of parts 18, 19 could be additionally loaded in the magazines with a weight. In this case also the sliding down of the parts takes place under the effect of gravity alone. In the region of the positioning means the cross-sections of the magazines can be reduced, as FIG. 2 in particular shows, in order to achieve optimum positioning. Moreover the magazines 9 could be provided with parts bent in the direction of the fitting zone 11 in the front region, which further facilitates the ejection of the parts 18. This is indicated in FIG. 2 by the reference numeral 54. Moreover it could be provided so to design the drive through the pedal 3 that, after putting the ear tag parts 18 and 19 together, the prong 43 or punch 12 are automatically retracted without taking the foot off the pedal 3. Through this feature it is possible to ensure in a simple way that the pedal 3 is reliably advanced every time as far as is necessary for the connection of the two parts 18, 19. Alternatively a stop can be fitted on the holder 8 which limits the movement of the punch 12 and thus indicates the completed connection of the parts 18, 19. Furthermore it would be possible to provide gently curved magazines instead of the essentially straight magazines 9, 10 and/or to alter the inclination of the magazines to the vertical seen in FIG. 1, so long as the curvature is so small or the magazine is arranged steeply enough for the parts 18, 19 to be able to slip down solely on account of gravity. The use of vertical magazines is also possible.

Further it would be possible to replace the pedal 3 by a key and to effect the movement of the punch 12 by an electrically or pneumatically operated drive. In this case it would further be possible to fix the whole apparatus to a wall, ceiling or the like by a cable or chain and move it to the ear of the animal when inserting the ear tag. The apparatus could thereby easily be arranged at different heights and be used alternatively for tagging other animals, especially e.g. sheep and other hoofed animals. In this mode of application it is recommended that the upper ends of the magazines are closed with detachable lids or the like, so that the ear tag parts 18, 19 cannot inadvertently fall out of the magazines during movement of the apparatus. Finally, it is particularly advantageous additionally to fix on the frame 1 or the holder 8 at least one further apparatus, especially a castrating apparatus 73 and/or a syringe 88, holder, in order to make the apparatus suitable also for other uses. Finally it will be understood that the various features can be used also in combinations other than those shown and described.

It will be understood that each of the elements describe above, or two or more together, may also find a useful application in other types of constructions differing from the types described above.

While the invention has been illustrated and described is embodied in a device for applying ear tags to animal's ears, it is not intended to be limited to the details shown, since various modifications and structural changed may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. Apparatus for fitting ear tags in animal ears (40), wherein the ear tags comprise first parts (18,18a) each provided with a pin (25) and second parts (19) each provided with an eye (21), said apparatus comprising a fitting zone (11); first and second positioning means (31,31a,32) spaced from each other and arranged on two opposing sides of the fitting zone (11) respectively and comprising means for arranging the first and second parts (18,18a,19) in fitting positions; two magazines (9,10,59) in the form of guide tracks for receiving a plurality of said first and second parts (18,18a,19) respectively, said magazines (9,10,59) being so arranged and designed that the first and second parts (18, 18a,19) can be fed one after the other to the positioning means (31,31a,32) under the action of gravity; a stop (37) associated with the second positioning means (32) for the second parts (19); and a reciprocating punch (12), by means of which one of the first parts (18, 18a) located in the fitting position can be so punched out of said fitting position and moved transversely through the fitting zone (11) in the direction of one of the second parts (19), whereby the pin (25) and the eye (21) come into engagement with each other and connect the two parts (18,18a,19) together.

2. Apparatus according to claim 1, wherein said positioning means (31,31a,32) are formed as catch devices and the magazines (9,10,59) are so formed and associated with the catch devices that only one of the first and one of the second parts (18,18*a*,19) can assume the fitting position.

3. Apparatus according to claim 2, wherein said catch devices are formed to complement selected sections of the first and second parts (18,18*a*,19) respectively for exact positioning of the first and second parts in the fitting positions.

4. Apparatus according to claim 2, wherein said positioning means (31,31*a*, 32) and the first and/or second parts (18,18*a*,19) are positioned in the fitting position so as to be arranged partially in the associated catch device and partially in the associated magazine (9,10,59) and an open region is provided in the fitting zone (11), facilitating the punching out or pulling out of the first and/or second parts (18,18*a*,19) from the fitting position.

5. Apparatus according to claim 1, wherein said magazine (9, 9*a*, 59; 10, 10*a*) for the first and/or second parts (18, 18*a*; 19) is formed as a C profile and is provided with a guide slot (29) receiving the pin (25).

6. Apparatus according to claim 1, wherein a retainer (46) is associated with the positioning means (31, 31*a*) for the first parts (18, 18*a*) for better positioning in the fitting position.

7. Apparatus according to claim 1, wherein said punch (12) has a prong (43) on a front end thereof at least partially insertable into blind bores (27) of the first parts (18,18*a*) and the prong (43) has a greater external cross-section than an internal cross-section of each of the blind bores (27).

8. Apparatus according to claim 1 wherein said punch (12) is of straight form, is mounted to reciprocate in a straight guide and can be actuated against the force of a spring (16) by means of a pedal (3).

9. Apparatus according to claim 1 for fitting ear tags having first and second parts (18, 19) being attached to each other by thin webs, wherein a retaining pin (74) is associated with at least one of the two magazines (59), which prevents, in a working position, the sliding of corresponding first or second parts (18, 19) under the action of gravity at selected points in time during the connecting operation.

10. Apparatus according to claim 9, wherein said retaining pin (74) can be brought into the working position by swinging the magazine (59).

11. Apparatus according to claim 1, further comprising a frame (1) or a holder (8).

12. Apparatus according to claim 11, further comprising a castration device (73) attached to said frame (1) or said holder (8).

13. Apparatus according to claim 11, further comprising a syringe holder (88) attached to said frame (1) or said holder (8).

* * * * *